United States Patent
Mahmoud et al.

(10) Patent No.: US 9,453,401 B2
(45) Date of Patent: *Sep. 27, 2016

(54) CHELATING FLUID FOR ENHANCED OIL RECOVERY IN CARBONATE RESERVOIRS AND METHOD OF USING THE SAME

(71) Applicant: KING FAHD UNIVERSITY OF PETROLEUM AND MINERALS, Dhahran (SA)

(72) Inventors: Mohamed Ahmed Nasr El-Din Mahmoud, Dhahran (SA); Khaled Zidan Abdelgawad, Dhahran (SA); Abdullah Saad Sultan, Dhahran (SA); Hasan Salman Al-Hashim, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 230 days.

This patent is subject to a terminal disclaimer.

(21) Appl. No.: 13/932,947

(22) Filed: Jul. 1, 2013

(65) Prior Publication Data

US 2015/0000919 A1    Jan. 1, 2015

(51) Int. Cl.
| | |
|---|---|
| C09K 8/532 | (2006.01) |
| E21B 43/25 | (2006.01) |
| C09K 8/528 | (2006.01) |
| C09K 8/58 | (2006.01) |

(52) U.S. Cl.
CPC .............. *E21B 43/25* (2013.01); *C09K 8/528* (2013.01); *C09K 8/58* (2013.01)

(58) Field of Classification Search
None
See application file for complete search history.

(56) References Cited

U.S. PATENT DOCUMENTS

| | | | |
|---|---|---|---|
| 4,432,881 A | 2/1984 | Evani | |
| 4,541,935 A | 9/1985 | Constien et al. | |
| 5,335,733 A * | 8/1994 | Sandiford et al. | 166/300 |

(Continued)

FOREIGN PATENT DOCUMENTS

| | | |
|---|---|---|
| CN | 101633835 A | 1/2010 |
| EP | 0 272 887 A2 | 6/1988 |

(Continued)

OTHER PUBLICATIONS

Abdulrazag Y. Zekri, Mohamed Nasr, and Zaid Ai-Arabai, "*Effect of LoSal on Wettability and Oil Recovery of Carbonate and Sandstone Formation*," International Petroleum Technology Conference held in Bangkok, Thailand, Nov. 15-17, 2011 (Abstract only).
"Thermodynamic Inhibition", BaSO4Scaling, Wikispaces Website, 2013, 3 pages.

*Primary Examiner* — Jeffrey Washville
(74) *Attorney, Agent, or Firm* — Richard C. Litman

(57) ABSTRACT

The chelating fluid for enhanced oil recovery in carbonate reservoirs and the method of using the same utilizes a chelating fluid injected into a carbonate oil reservoir through a fluid injection system. The chelating fluid is a solution of a polyamino carboxylic acid chelating agent in brine, with the polyamino carboxylic acid chelating agent having a concentration of approximately 5.0 wt % of the solution, with the solution having a pH of approximately 11.0. The polyamino carboxylic acid chelating agent is preferably ethylenediaminetetraacetic acid (EDTA). The brine preferably has a relatively high salinity, with a sodium chloride concentration preferably on the order of approximately 18,300 ppm.

3 Claims, 1 Drawing Sheet

(56) References Cited

U.S. PATENT DOCUMENTS

2006/0116296 A1* 6/2006 Kippie et al. ................ 507/244
2006/0142166 A1   6/2006 Thomas
2008/0312108 A1  12/2008 Berger et al.
2011/0059872 A1   3/2011 Weerasooriya et al.

FOREIGN PATENT DOCUMENTS

| WO | WO 2009/058590 A2 | 5/2009 |
| WO | WO 2011/100136 A1 | 8/2011 |
| WO | WO 2012/171858 A1 | 12/2012 |

* cited by examiner

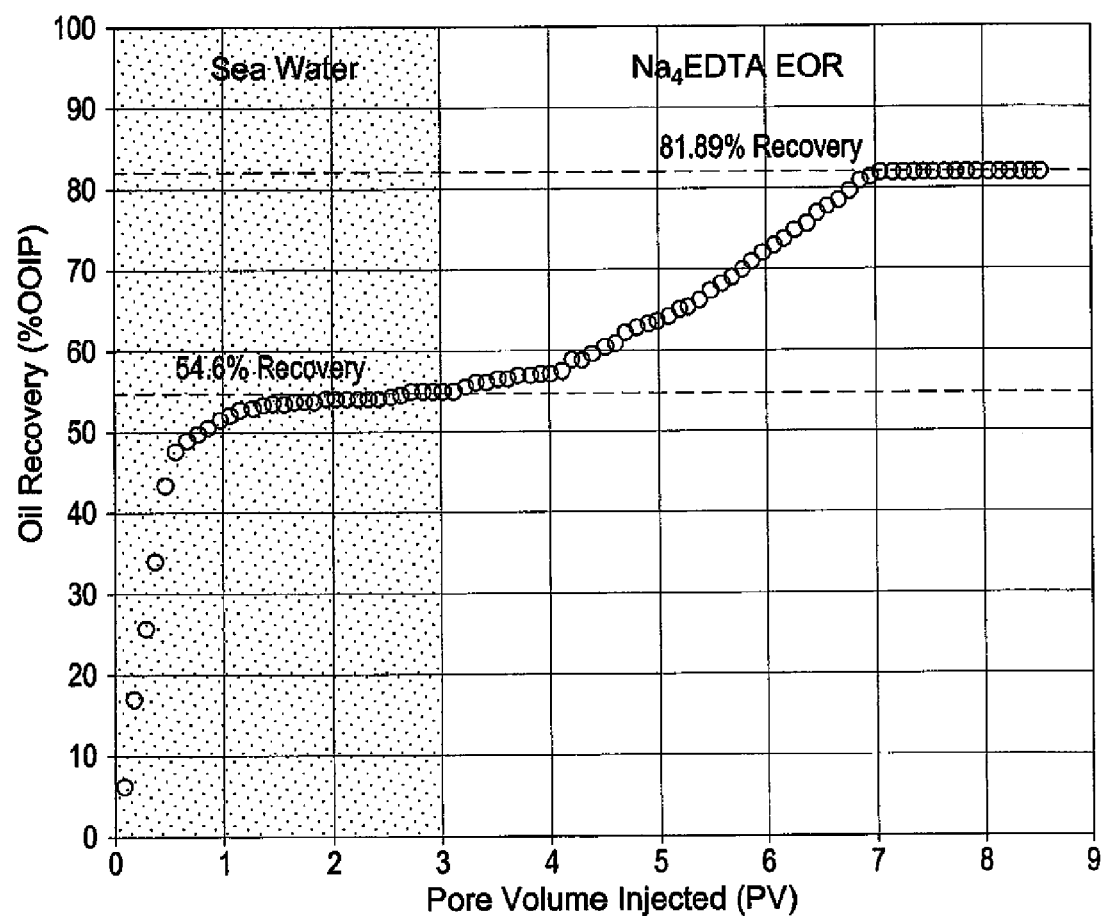

CHELATING FLUID FOR ENHANCED OIL RECOVERY IN CARBONATE RESERVOIRS AND METHOD OF USING THE SAME

BACKGROUND OF THE INVENTION

1. Field of the Invention

The present invention relates to the prevention of scale formation and enhancement of oil recovery in carbonate oil reservoirs, and particularly to a chelating fluid formed from a polyamino carboxylic acid chelating agent in brine and the usage thereof in water injection systems of carbonate oil reservoirs.

2. Description of the Related Art

Scale deposition is one of the most serious concerns in oil reservoirs, particularly in water injection systems therefor. Scale problems are particularly prevalent in systems which combine two incompatible types of water, such as sea water and formation brines. Two types of water are considered to be incompatible if they interact chemically and precipitate minerals when mixed. Typical examples include sea water with high concentrations of sulfate ions (at least 4,000 ppm) and formation waters, with high concentrations of calcium, barium and strontium ions (often more than 30,000 ppm). Mixing of these waters may cause precipitation of calcium sulfate, barium sulfate and/or strontium sulfate.

Scale formation in surface and subsurface oil and gas production equipment is not only a major operational problem, but also a major cause of formation damage in both injection and production wells. Scale formation may cause equipment wear and corrosion, along with flow restriction which results in a decrease in oil and gas production due to the excessive pressure drop. Scale deposition further restricts the oil and gas flow by decreasing the area available for flow (by a decrease of the flow pipe's diameter) which, in turn, causes an increase in the friction pressure losses. The latter consideration affects the flowing bottom hole pressure and, consequently, the outflow performance of the well. The lowered outflow performance lowers the well's draw down and decreases the overall deliverability of the well. Scale deposits often form at the tops of wells, requiring removal of the associated pipes and tubing, which generates high operational costs and temporary work stoppages.

Scale control is typically performed as a two-step treatment involving first removal of the precipitated scale, and then prevention of its reformation by chemical inhibitors. At present, there is no effective single stage treatment that will both remove and inhibit scale precipitation in oil and gas reservoirs during the process of water injection in enhanced oil recovery or pressure maintenance processes.

Typical scales formed in such environments often include calcium sulfate. These deposits can typically be removed chemically. However, scale composition frequently changes during the production history of the well, causing many scales that are initially subject to chemical removal treatments to become very difficult to be removed by subsequent chemical treatment. There are many chemicals available that will prevent scale deposition, however most will not remain in the formation long enough to make them economically feasible as inhibitors.

Thus, a chelating fluid for enhanced oil recovery in carbonate reservoirs and a method of using the same addressing the aforementioned problems is desired.

SUMMARY OF THE INVENTION

The chelating fluid for enhanced oil recovery in carbonate reservoirs and the method of using the same utilizes a chelating fluid injected into a carbonate oil reservoir through a fluid injection system. The chelating fluid is a solution of a polyamino carboxylic acid chelating agent in brine, with the polyamino carboxylic acid chelating agent having a concentration of approximately 1.0 wt % to approximately 5.0 wt % of the solution, with the solution having a pH of between approximately 10.5 and approximately 11.0. The polyamino carboxylic acid chelating agent is preferably ethylenediaminetetraacetic acid (EDTA). The brine preferably has a relatively high salinity, with a sodium chloride concentration preferably on the order of approximately 18,300 ppm.

These and other features of the present invention will become readily apparent upon further review of the following specification.

BRIEF DESCRIPTION OF THE DRAWINGS

The sole drawing FIGURE is a graph comparing oil recovery (% OOIP) as a function of pore volume injected for a control fluid of seawater and a chelating fluid for enhanced oil recovery in carbonate reservoirs according to the present invention, with recovery occurring at a temperature of approximately 100° C. with fluid injection at a rate of approximately 0.25 cm$^3$/min.

Unless otherwise indicated, similar reference characters denote corresponding features consistently throughout the attached drawings.

DETAILED DESCRIPTION OF THE PREFERRED EMBODIMENTS

As a control, untreated sea water with a high sulfate content was injected into a limestone core which was initially saturated with brine. The contents of the sea water and the connate water (water that is trapped in the pores of sedimentary rocks) are shown below in Table 1.

TABLE 1

Composition of Connate Water and Formation Brine

| Ions | Connate Water (ppm) | Formation Brine (i.e., Seawater) (ppm) |
|---|---|---|
| Sodium | 59,491 | 18,300 |
| Calcium | 19,040 | 650 |
| Magnesium | 2,439 | 2,110 |
| Sulfate | 350 | 4,290 |
| Chloride | 132,060 | 32,200 |
| Bicarbonate | 354 | 120 |
| TDS | 213,734 | 57,670 |

Core flooding experiments were performed using limestone cores each having a diameter of 3.75 cm and lengths of 18.36 cm. The overall volume of each core sample was 202.92 cm$^3$ with a pore volume of 40.69 cm$^3$, resulting in a porosity of 20.05%. The density of each core sample was 2.67 gm/cm$^3$, and each had a permeability of 8.29 mD. In the experiments, the initial water saturation $S_{wi}$ was 32.42% with an original oil in place (OOIP) of 27.50%.

The core samples were placed in a flooding system capable of handling temperatures up to 150° C., core pressures up to 3,000 psi, and overburden pressures up to 10,000 psi. Volumes of oil, formation brine (i.e., seawater) and chelating agent solution were supplied via a high-pressure floating piston accumulator driven by an external high pressure syringe pump. Oil production was collected by a fractional collector plate positioned at the outlet of the flooding system.

In addition to the control seawater flooding, core flooding experiments were also performed with the present chelating fluid, which is an approximately 5.0 wt % $Na_4EDTA$ solution. The chelating fluid was prepared by mixing 40 wt % ethylenediaminetetraacetic acid (EDTA) with the same formation brine, resulting in the 5.0 wt % $Na_4EDTA$ solution. As will be described in detail below, the addition of 5.0 wt % EDTA to the brine increased the oil recovery from the limestone cores by approximately 30%.

The core samples described above were first cleaned with toluene, followed by alcohol, and then dried at a temperature of 100° C. in an oven. The dry weight of each core sample was then measured and recorded, and then each core sample was saturated with connate water, under vacuum, for two days. The weight of each sample, following saturation, was then measured and recorded. The pore volumes of both the dry and saturated core sample was determined, and each core sample was placed in the core holder of the flooding system and subjected to an overburden pressure of 3,500 psi. The backpressure of the system was set to 1,000 psi. The core holder was placed in the oven of the system and then flooded with oil until no water could be produced in order to measure the connate water saturation $S_{wi}$. The system temperature was then stabilized at 100° C. and the backpressure was gradually raised to match the desired reservoir pressure. Each core was flooded by three pore volumes of seawater at a rate of 0.25 cm$^3$/min and the oil production was measured and recorded. Each core was then flooded with the chelating agent solution until no further oil was produced.

The chelating fluid was used to recover oil both from the residual oil and from the initial oil saturation. The pH values of the different flooding fluids are given below in Table 2.

TABLE 2

| pH Values of Experimental Flooding Solutions | |
|---|---|
| Solution | pH |
| Seawater | 7.50 |
| 5.0 wt % EDTA + Seawater | 11 |

The sole FIGURE shows the oil recovery (% OOIP) by seawater flooding (i.e., the control) followed by flooding with the present chelating fluid. Overall oil recovery, compared with the seawater control, is found to increase up to 81.98% (OOIP) without diluting the seawater. The incremental oil recovery was about 60% of the residual oil left behind in the water flooding before the enhanced oil recovery (EOR) stage (27.23% of the OOIP).

The higher recovery factor achieved by this flooding indicates that the rock dissolution is the dominant recovery mechanism behind low salinity and seawater flooding in limestone reservoirs. Further, lowering the interfacial tension (IFT), contact angle, and increasing EDTA viscosity can be considered as additional mechanisms in the oil recovery process. The viscosity of the EDTA solution will go up as it chelates more calcium from the calcite cores, as shown below in Table 3.

TABLE 3

| Viscosity and Density of 5.0 wt % EDTA Solution Prepared in De-ionized Water at 70° F. | | |
|---|---|---|
| Calcium Concentration (ppm) | Viscosity (cP) | Density (g/mL) |
| 0 | 1.45 | 1.101 |
| 5000 | 1.64 | 1.115 |
| 10000 | 1.98 | 1.134 |
| 20000 | 2.14 | 1.187 |
| 30000 | 2.67 | 1.221 |

Table 4 below shows the interfacial tension (IFT) of Arabian light oil measured as a function of pH. Increasing the solution pH decreases the IFT between oil and rock. In the present chelating fluid, the pH of the solution is 11. By utilizing a high pH solution, oil recovery is enhanced by decrease in the IFT.

TABLE 4

| IFT of Arabian Light Oil at Varying pH Values | |
|---|---|
| pH | IFT (N/m) |
| 2 | 15.8 |
| 3 | 17 |
| 4 | 20.2 |
| 4.5 | 17.8 |
| 5.1 | 20 |
| 7 | 13.9 |
| 9.21 | 5.4 |
| 10 | 5.2 |
| 13 | 0.1 |

It is to be understood that the present invention is not limited to the embodiments described above, but encompasses any and all embodiments within the scope of the following claims.

We claim:

1. A chelating fluid for enhanced oil recovery in carbonate reservoirs, consisting of a solution of a polyamino carboxylic acid chelating agent in brine, wherein the polyamino carboxylic acid chelating agent comprises 5.0 wt % of the solution, the solution having a pH of 11.0.

2. The chelating fluid for enhanced oil recovery in carbonate reservoirs as recited in claim 1, wherein the polyamino carboxylic acid chelating agent comprises ethylenediaminetetraacetic acid.

3. The chelating fluid for enhanced oil recovery in carbonate reservoirs as recited in claim 1, wherein the brine has a sodium chloride concentration of 18,300 ppm.

* * * * *